US012713080B2

(12) United States Patent
Kwak et al.

(10) Patent No.: US 12,713,080 B2
(45) Date of Patent: Aug. 18, 2026

(54) METHOD OF SEAMLESS PLAYBACK BETWEEN DOWNLOAD DATA AND STREAMING DATA BY USING LOCAL WEB SERVER, AND DEVICE THEREFOR

(71) Applicant: SK Telecom Co., Ltd., Seoul (KR)

(72) Inventors: Kyung Chul Kwak, Seoul (KR); Gun Song, Seoul (KR); Dai Boong Lee, Seoul (KR); In Tai Kim, Seoul (KR); Hyun Chul Joo, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 19/001,105

(22) Filed: Dec. 24, 2024

(65) Prior Publication Data

US 2025/0133248 A1 Apr. 24, 2025

Related U.S. Application Data

(63) Continuation of application No. PCT/KR2023/008848, filed on Jun. 26, 2023.

(30) Foreign Application Priority Data

Jun. 27, 2022 (KR) ........................ 10-2022-0078530

(51) Int. Cl.
*H04N 21/2387* (2011.01)
*H04N 21/845* (2011.01)

(52) U.S. Cl.
CPC ....... *H04N 21/2387* (2013.01); *H04N 21/845* (2013.01)

(58) Field of Classification Search
None
See application file for complete search history.

(56) References Cited

U.S. PATENT DOCUMENTS 8,271,003 B1 * 9/2012 Othmer ............ H04M 3/53358 455/412.2
9,979,926 B1 5/2018 Asarikuniyil
(Continued)

FOREIGN PATENT DOCUMENTS

CN 107113474 A 8/2017
CN 111866526 A * 10/2020 ......... H04N 21/4383
(Continued)

OTHER PUBLICATIONS

International Search Report of PCT/KR2023/008848 mailed on Oct. 25, 2023.

(Continued)

*Primary Examiner* — Ricky Chin
(74) *Attorney, Agent, or Firm* — Hauptman Ham, LLP

(57) ABSTRACT

The present disclosure provides a method of seamless playback between downloaded data and streaming data by using a local web server, and a device for the same, and provides in at least one embodiment a method of operating a terminal for seamless playback of content, including downloading and storing in a storage, by a download agent, initial segments that is at least some of media segments composing each of a plurality of contents, and transferring, by a local web server to a player, initial segments of a first content among the media segments stored in the storage, and requesting, by the local web server, the download agent to download remaining segments of the first content.

11 Claims, 6 Drawing Sheets

(56) References Cited

U.S. PATENT DOCUMENTS 11,272,227 B1 * 3/2022 Enigma .............. H04N 21/8456
12,483,747 B2 * 11/2025 Yu ...................... H04N 21/8456
2012/0271688 A1 10/2012 Jaouen et al.
2014/0189772 A1 * 7/2014 Yamagishi ....... H04N 21/21805 725/116
2014/0244805 A1 8/2014 Lee et al.
2014/0359081 A1 * 12/2014 Van Deventer ......... H04L 67/63 709/219
2015/0007239 A1 * 1/2015 Cranman ........... H04N 21/2402 725/95
2015/0319214 A1 * 11/2015 Yu ........................... H04L 67/63 709/219
2016/0021211 A1 * 1/2016 Yellin ................... H04L 67/535 709/203
2016/0077710 A1 * 3/2016 Lewis ................. G06F 3/04842 715/716
2016/0149978 A1 * 5/2016 Wissingh ......... H04N 21/26258 709/231
2016/0373546 A1 * 12/2016 Lotfallah ............ H04L 65/1069
2017/0149860 A1 * 5/2017 Ben Eli ................... H04L 65/65
2017/0195450 A1 * 7/2017 Su ...................... H04N 21/4331
2017/0324797 A1 11/2017 Lee
2018/0069909 A1 3/2018 Suri
2018/0376202 A1 * 12/2018 Cho ..................... H04N 21/462
2019/0014370 A1 * 1/2019 Weber .................. H04N 21/438
2019/0208263 A1 * 7/2019 Chamberlin ..... H04N 21/44213
2020/0322656 A1 * 10/2020 Reitmeier .......... H04N 21/4384
2021/0127147 A1 4/2021 Shin
2021/0306708 A1 * 9/2021 Song .................. H04N 21/4821
2022/0191558 A1 * 6/2022 Kim ................... H04N 21/6581
2023/0103596 A1 * 4/2023 Chundi ................. G06F 3/0482 715/716
2025/0133248 A1 * 4/2025 Kwak ................ H04N 21/2387

FOREIGN PATENT DOCUMENTS

CN 112672186 A * 4/2021
CN 114630157 A * 6/2022 ......... H04N 21/4384
CN 117157988 A * 12/2023 ......... H04N 21/8456
CN 119031155 A * 11/2024 ............. H04L 69/18
FR 3096541 A1 * 11/2020 ........... H04L 65/764
KR 10-2012-0047987 A 5/2012
KR 10-1382421 B1 4/2014
KR 10-2019-0052032 A 5/2019
KR 10-2021-0028805 A 3/2021
KR 10-2021-0049600 A 5/2021
KR 20240001623 A * 1/2024 ....... H04N 21/47217

OTHER PUBLICATIONS

Office Action of the corresponding CN Application No. 202380060520.9 mailed on Dec. 21, 2025.
Office Action issued on Apr. 26, 2026, for corresponding Chinese Patent Application No. 202380060520.9, with its English machine translation, 17 pages.

* cited by examiner

METHOD OF SEAMLESS PLAYBACK BETWEEN DOWNLOAD DATA AND STREAMING DATA BY USING LOCAL WEB SERVER, AND DEVICE THEREFOR

CROSS-REFERENCE TO RELATED APPLICATIONS

The present application is a bypass continuation of PCT International Application No. PCT/KR2023/008848, filed Jun. 26, 2023, which is based upon and claims priority to Republic of Korea Patent Application No. 10-2022-0078530, filed on Jun. 27, 2022, which are incorporated by reference herein in their entirety.

TECHNICAL FIELD

The present disclosure in some embodiments relates to a method of seamless playback between downloaded data and streaming data by using a local web server, and a device for the same.

BACKGROUND

The statements in this section merely provide background information related to the present disclosure and do not necessarily constitute prior art.

As media viewing behavior gradually shifts from live content to on-demand content, various over-the-top (OTT) services are attempting to differentiate themselves.

Among them, file-based live broadcasting services are generally provided in a short-form format, and their user experience (UX) supports moving from content to content via swipes up and down and/or left and right.

The content of short-form platforms and traditional OTT differs not only in the length, but also in how it is delivered, with traditional OTT requiring the curation provided by the platform, which includes content pre-determined in playback order, to be watched first. This is similar to the user experience of watching live broadcast services in the past.

The biggest issue with providing these services on a streaming basis is the delay associated with switching between content. HTTP-based streaming services suffer from head-of-line (HOL) blocking, where an earlier packet is not processed within the queue of packets on the network and the subsequent packets in the same queue will be delayed. In addition, the player may require its buffer to retain some of the content above a certain size to overcome network jitter before playback is enabled, and these factors cause an initial delay in the playback of streaming content.

FIG. 1 is a diagram illustrating delay factors during playback of content by using streaming. Referring to FIG. 1, the delay during the playback of streaming content may have three delay components which are TCP session connection delay $\Delta_1$, buffering delay $\Delta_2$ to overcome network jitter, and playback delay $\Delta_3$ required to decode and render the received content. Under normal circumstances, the three delay components are repeatedly introduced each time the content is switched. Therefore, frequent hopping between content causes these initial delays to occur more frequently, which leads to customer dissatisfaction with the service.

An easy way to solve this issue is to prepare playback of the contents to be shifted in multiple players and then switch players simultaneously with the contents being shifted. However, this method is difficult to apply to low-spec terminals because it requires multiple players to be used simultaneously in the user interface. Additionally, when the prepared pieces of content are not those selected by the user, the delay is not reduced while only depleting additional resources of the terminal to prepare the desired content for playback.

SUMMARY

The present disclosure in some embodiments seeks to provide a method and device for minimizing TCP session connection delay and buffering delay, among delay factors that occur during content playback (or switching).

The challenges that the present disclosure seeks to address are not limited to those mentioned above, and other challenges not mentioned will be apparent to those of ordinary skill in the art from the following description.

At least one aspect of the present disclosure provides a method of operating a terminal for seamless playback of content, including downloading and storing in a storage, by a download agent, initial segments of each of a plurality of contents, wherein the initial segments of each content comprising at least some of a plurality of media segments composing each content, transferring, by a local web server, initial segments of a first content among the media segments stored in the storage to a player, and requesting, by the local web server, the download agent to download remaining segments of the first content.

Another aspect of the present disclosure provides a terminal including a download agent configured to download and store in a storage initial segments of each of a plurality of contents, wherein the initial segments of each content comprising at least a portion of a plurality of media segments composing each content, and a local web server configured to transfer, to a player, initial segments of a first content among the media segments stored in the storage and to request the download agent to download the remaining segments of the first content.

Yet another aspect of the present disclosure provides a computer-readable recording medium storing instructions for causing, when executed by a computer, the computer to perform the method mentioned above.

According to some embodiments of the present disclosure, a portion of each piece of content in a playlist is downloaded in advance and provided quickly upon request, thereby minimizing TCP session connection delays and buffering delays among delay factors that occur during content playback.

According to some embodiments of the present disclosure, content is provided to the player by a suitable combination of streaming and downloading while utilizing a local web server, thereby allowing content obtained by both methods can be played continuously without modification to the player.

According to some embodiments of the present disclosure, both playback from the beginning and follow-up viewing playback can be supported for each piece of content.

According to some embodiments of the present disclosure, a local web server can be used instead of receiving streaming content by the player for playback, thereby minimizing interaction between the player and the service infrastructure and simplifying the implementation of the player.

According to some embodiments of the present disclosure, a download agent can be utilized to manage a list of content required for playback.

The effects of the present disclosure are not limited to those mentioned above, and other effects not mentioned will be apparent to those of ordinary skill in the art from the following description.

DETAILED DESCRIPTION

Figure 1:
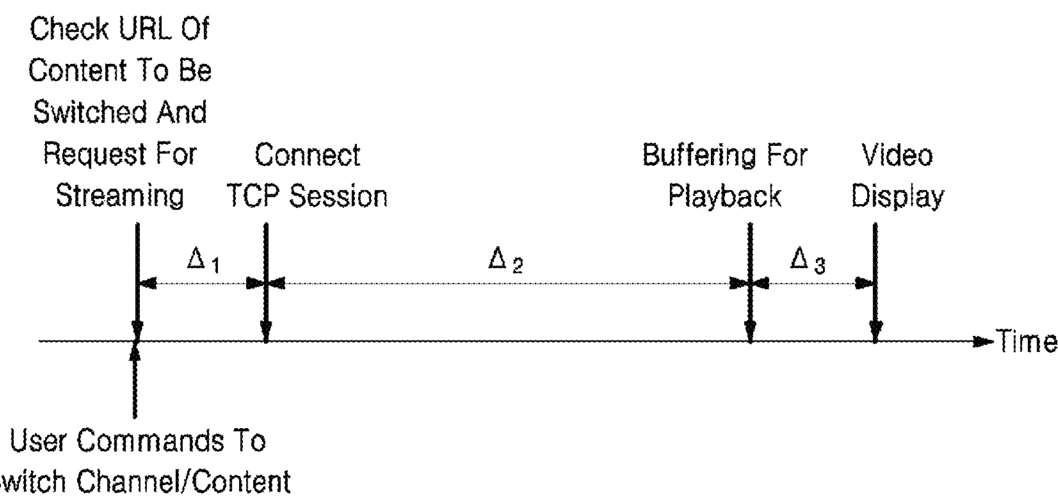
FIG. 1 is a diagram illustrating initial delay factors in the playback of content by using streaming.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary.

The description of the present disclosure to be presented below in conjunction with the accompanying drawings is intended to describe exemplary embodiments of the present disclosure and is not intended to represent the only embodiments in which the technical idea of the present disclosure may be practiced.

Figure 2:
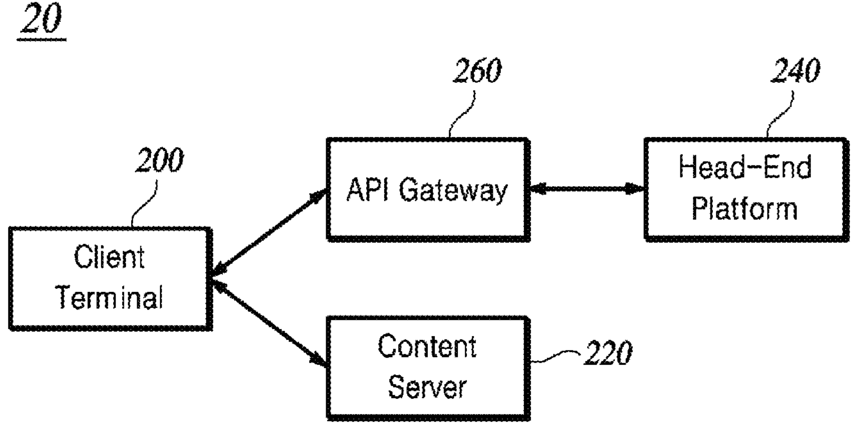
FIG. 2 is a schematic block diagram of a streaming service providing system according to at least one embodiment of the present disclosure.

FIG. 2 is a schematic block diagram of a streaming service providing system according to at least one embodiment of the present disclosure.

As shown in FIG. 2, a streaming service providing system 20 may include all or some of a client terminal 200, a content server 220, a head-end platform 240, and an application programming interface gateway (API gateway) 260. Not all of the blocks illustrated in FIG. 2 are requisite components, and in other embodiments, some blocks included in the streaming service providing system 20 may be added, changed, or deleted.

The client terminal 200 is a device that can receive content from the content server 220 by using wireless or wired communication methods and play it. Here, the content may be, but is not limited to, video-on-demand (VoD) type media content.

The client terminal 200 may receive content from the content server 220 in a streaming manner and play it. To provide an efficient streaming service, the content server 220 may be implemented as a content delivery network (CDN) including an original server and one or more cache servers.

The head-end platform 240 may perform user authentication for the streaming service and may provide the client terminal 200 with a playlist containing one or more contents and a streaming address, e.g., uniform resource locator (URL), of the contents.

At this point, the head-end platform 240 may receive the user authentication request, playlist request, and/or streaming address request from the client terminal 200 via the API gateway 260.

The API gateway 260 may be implemented as a server that aggregates endpoints for requests from the client terminal 200. The API gateway 260 may forward requests received from the client terminal 200 to the head-end platform 240 and may forward responses received from the head-end platform 240 to the client terminal 200. Depending on embodiments, the API gateway 260 may also process the received requests or responses and forward them to the head-end platform 240 or the client terminal 200.

Figure 3:
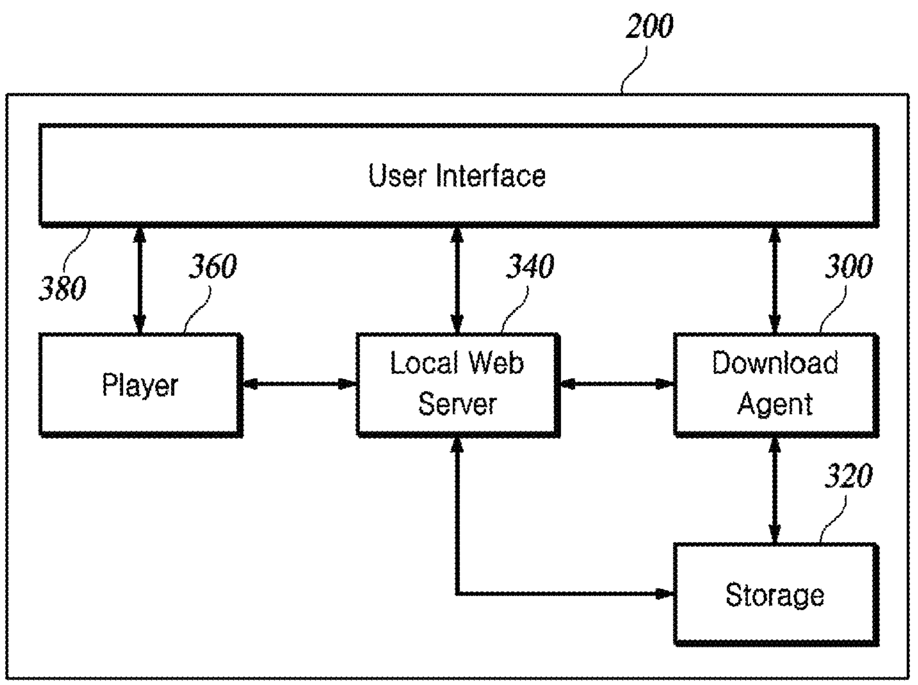
FIG. 3 is a schematic block diagram of a client terminal according to at least one embodiment of the present disclosure.

FIG. 3 is a schematic block diagram of the client terminal according to at least one embodiment of the present disclosure.

As shown in FIG. 3, the client terminal 200 may include all or part of a download agent 300, a storage 320, a local web server 340, a player 360, and a user interface 380. Not all of the blocks illustrated in FIG. 3 are requisite components, and in other embodiments, some of the blocks included in the client terminal 200 may be added, changed, or deleted.

The download agent 300 may manage downloads of content. The download agent 300 may download media segments of content from the content server 220 and store them in the storage 320. The media segments may include various media formats, such as, but not limited to, MP4, fragmented MP4 (FMP4), or transport stream (TS).

The download agent 300 may pre-download initial data for each of a plurality of contents in the user's playlist from the content server 220 and store the pre-download initial data in the storage 320, before the content to be played is selected. The plurality of contents may refer to a plurality of different videos or a plurality of different sections within a single video. For example, the plurality of content may be a plurality of highlight sections specified for a single video. The initial data may include at least some of the media segments of the content and/or content attributes. The content attributes may include a video/audio configuration information, such as a PAT or PMT, and manifest file that includes an index of the segments.

Thereafter, when the content to be played on the client device 200 is selected, the download agent 300 may download the remaining portions of the content for complete playback of the selected content and may notify the local web server 340 of the download progress.

In addition, the download agent 300 may manage data stored in the storage 320. For example, the download agent 300 may remove unneeded data from the data stored in the storage 320 based on preset conditions. In embodiments of the present disclosure, content is stored in the storage 320 without being directly streamed and played by the player 360, so the download agent 300 may perform appropriate management of unused segments to ensure efficient use of the storage 320.

The storage 320 may temporarily or semi-permanently store the media segments and/or content attributes downloaded by the download agent 300.

The local web server 340 may transfer the media segments and/or content attributes stored in the storage 320 to the player 360 to support continuous streaming on the player 360. The player 360 may function to playback content with the media segments and the like obtained from the local web server 340.

The player 360 may include a buffer, and may only begin playback of content once a certain amount of segments have been filled in the buffer to overcome network jitter.

When the content to be played on the client device 200 is selected, the local web server 340 may transfer initial data pre-stored in the storage 320 to the player 360 to quickly satisfy the conditions for initial playback on the player 360.

In general, communication between the client terminal 200 and the content server 220 is made via a public network, and it may be difficult to ensure reliable high-speed transmission. However, communication via the local web server 340 according to the present disclosure occurs inside the client terminal 200, which can sufficiently ensure stable high-speed transmission and does not cause head of line (HOL) blocking issues. Accordingly, the local web server 340 can quickly fill the buffer of the player 360 with media segments pre-stored in the storage 320, thereby dramatically reducing the time required for buffering.

According to at least one embodiment of the present disclosure, by using the local web server 340, interaction may be minimized between the player 360 and a service infrastructure, such as the content server 220. Furthermore, the player 360 may be implemented simply by utilizing any known players, as it only needs to request consecutive segments from the local web server 340.

The user interface 380 may be a physical medium or a virtual medium implemented for temporary or permanent access to enable interaction between a user and the client terminal 200.

The user interface 380 may include at least one input means that may be manipulated by the user and at least one output means that displays the results of the user's utilization. The user interface 380 may include at least one object designed to interact with the user, such as a display screen, a keyboard, a mouse, text, or icons.

Figure 4:
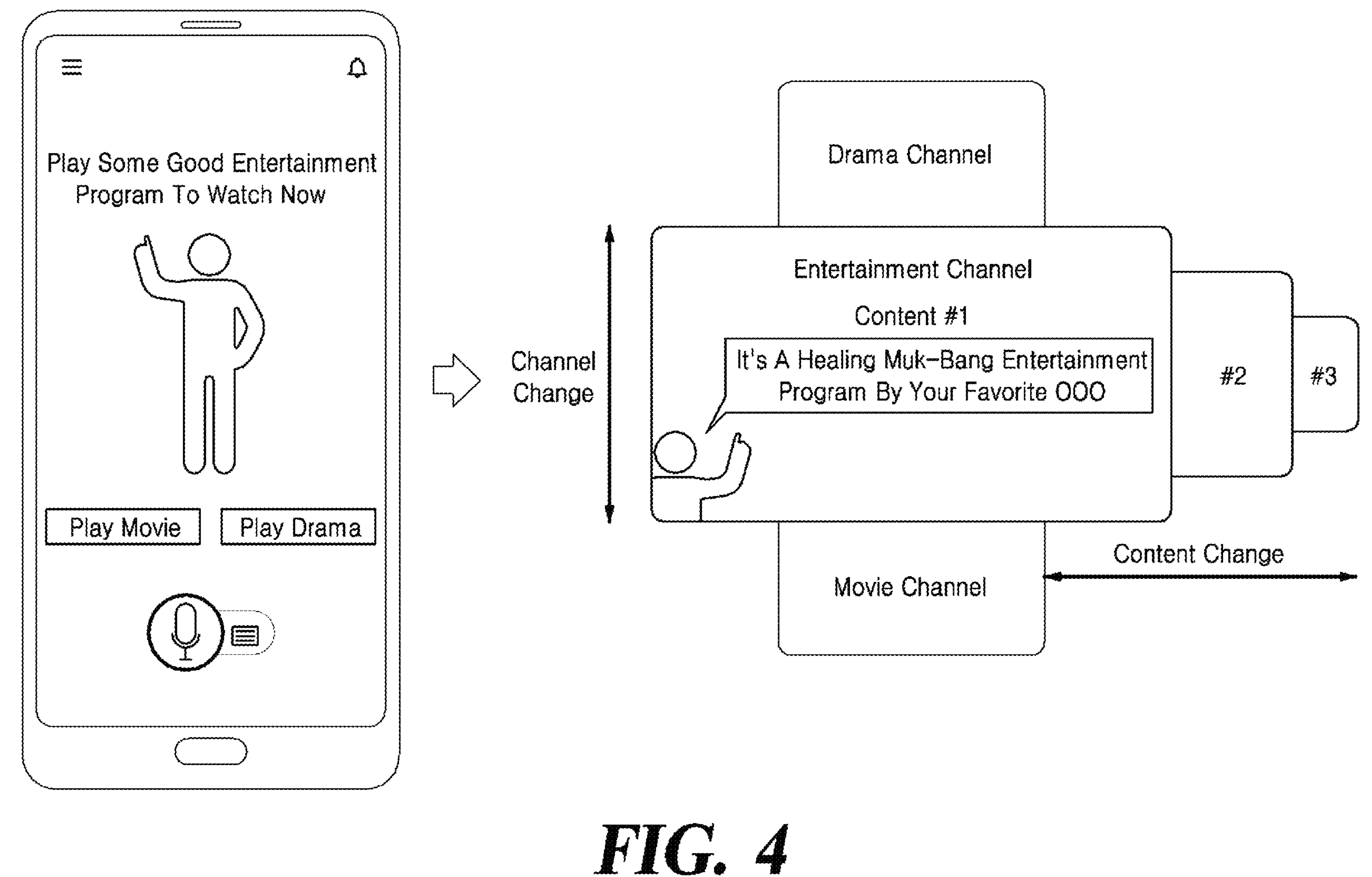
FIG. 4 is a diagram illustrating content switching in a streaming service, according to at least one embodiment of the present disclosure.

FIG. 4 is a diagram illustrating content switching in a streaming service, according to at least one embodiment of the present disclosure.

Referring to FIG. 4, the client terminal 200 according to at least one embodiment of the present disclosure may provide a plurality of channels and contents to a user. Here, each channel may be composed of content of a particular genre, such as entertainments, dramas, movies, and/or documentaries. In the example of FIG. 4, a 'content #1' of a 'entertainment channel' is a viewing content that is being played or scheduled to be played by the client terminal 200, and a 'content #2' and a 'content #3' of the 'entertainment channel' along with a 'drama channel', a 'movie channel' are neighboring contents that can be navigable from the viewing content.

The client terminal 200 may receive, from a user via the user interface 380, a request to switch to content in a different channel or to switch to different content within the same channel. The user may request the client terminal 200 to switch content via a preset gesture input. Here, the gesture input may include at least one of swipe, flick, pan, tap, double tap, drag and drop, and pinch in and out.

For example, the user may request to switch to a different channel via a swipe motion in the first direction, and may request to switch to different content within the same channel via a swipe motion in a second direction. Here, the first direction may be, but is not limited to, a vertical direction, i.e., up or down, and the second direction may be, but is not limited to, a horizontal direction, i.e., left or right. For example, according to other embodiments, the user may request to switch content by tapping or double-tapping at least one side of the screen displayed by the user interface 380.

The client terminal 200 may determine which content to switch to based on the gesture input detected via the user interface 380 and a predefined sequence of channels and/or content.

In at least one embodiment, upon detecting an upward or downward swipe motion, the client terminal 200 may determine the initial content within the adjacent channel corresponding to the upward or downward swipe as the content to switch to. In the example of FIG. 4, upon detecting an upward swipe motion, the client terminal 200 may determine that the initial content in the "movie channel" is content to switch to. On the other hand, upon detecting a downward swipe motion, the client device 200 may determine the initial content of the "drama channel" as the content to switch to. Here, the initial content may be, but is not limited to, the content defined by the first order of playback of the relevant content or the last content played by the user in the relevant channel.

On the other hand, upon detecting a leftward or rightward swipe motion, the client device 200 may determine that the content in the previous or next playback sequence of the viewing content, within the currently viewed channel, is the content to be switched to. In the example of FIG. 4, upon detecting a leftward swipe motion, the client terminal 200 may determine that 'content #2' of the 'entertainment channel' is content to switch to. On the other hand, upon detecting a rightward swipe after the switch to 'content #2' of the 'entertainment channel' is completed, the client device 200 may determine 'content #1' of the 'entertainment channel' as the content to switch to.

As used in the present disclosure, switching (or changing) content may be used as an umbrella term for both switching to content on a different channel and switching to different content within the same channel.

Figure 5:
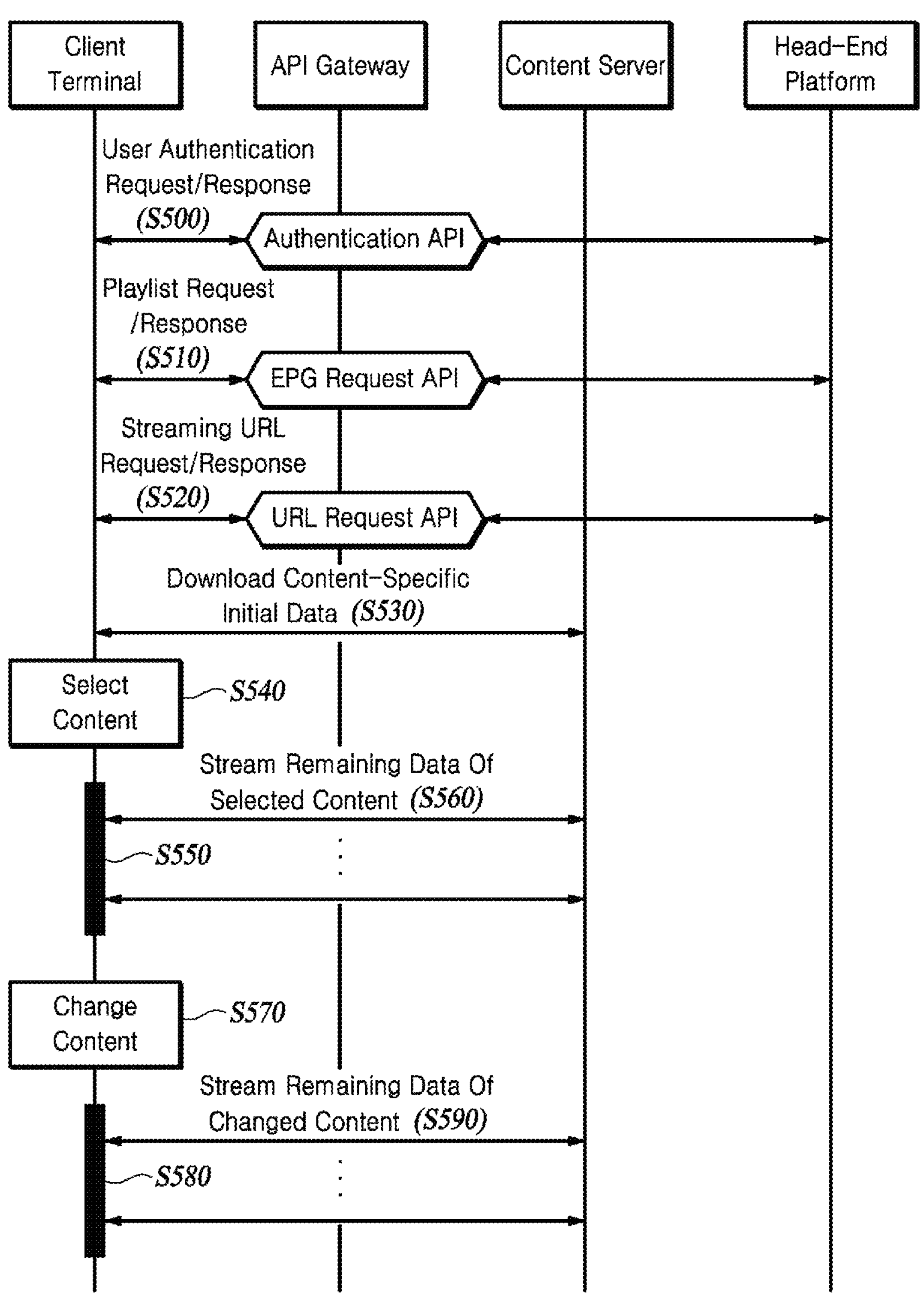
FIG. 5 is a flowchart of a streaming service procedure according to at least one embodiment of the present disclosure.

FIG. 5 is a flowchart of a streaming service procedure according to at least one embodiment of the present disclosure.

Upon initial service startup, the client terminal 200 may call an authentication API to perform user authentication (S500). Here, the user authentication request sent by the client terminal 200 may include user account information.

The client terminal 200 may call an electronic program guide (EPG) API to obtain a playlist from the head-end platform 240 (S510). Here, the playlist may include a list of content curated via personalized recommendations or the like to the client device 200. The playlist may further include the number of media segments to be pre-downloaded per content and a time value, etc. Here, the time value may be a time value corresponding to the user's last viewing point, to support a follow-up viewing feature for the relevant content.

The client device 200 may call a URL request API to obtain the streaming URL of each content in the playlist from the head-end platform 240 (S520).

Using the streaming URL of each content, the client device 200 may download content-specific initial data from the content server 220 (S530). Here, the content-specific initial data may include at least some of the media segments of each content. For example, the client terminal 200 may pre-download, for each content, segments by a preset number counted from the playback start point of each content as initial data.

Upon selecting the content to be played (S540), the client device 200 may quickly begin playback with the initial data of the selected content (S550).

For complete playback of the selected content, the client device 200 may receive and playback the remaining data of the corresponding content from the content server 220 (S560).

Upon detecting a request to change the playback content (S570), the client device 200 may quickly start playback with the initial data of the content to change to (S580).

For a complete playback of the changed content, the client device 200 may receive and playback the remaining data of the corresponding content from the content server 220 (S590).

Meanwhile, in Step S580, the client terminal 200 may receive a content change request manually from the user, or may automatically generate a content change request when playback of the preceding content is complete or is about to be completed. When the content change request is generated automatically, a plurality of contents may be played one after the other in a predefined order.

Figure 6:
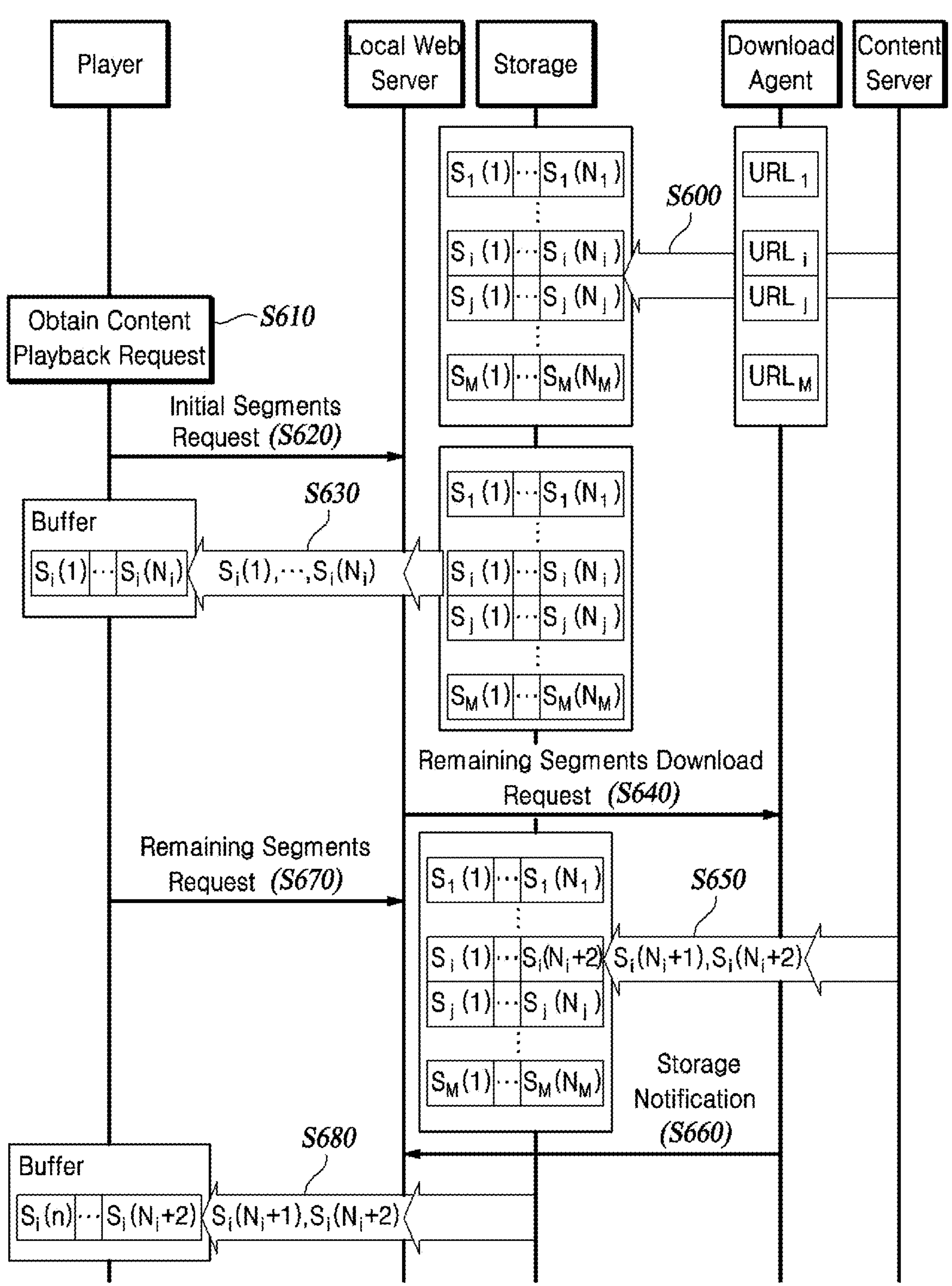
FIG. 6 is a flowchart of operations of a client terminal for seamless playback of selected content, according to at least one embodiment of the present disclosure.

FIG. 6 is a flowchart of operations of the client terminal for seamless playback of the selected content, according to at least one embodiment of the present disclosure.

Hereinafter, specific operations of the client terminal 200 in Steps S530 to S560 of FIG. 5 will be described with reference to FIG. 6. In FIG. 6, an example case is described where the i-th content of M contents in a playlist is played (i is a natural number less than or equal to M, a natural number).

The download agent 300 may use the streaming URL of each content to download from the content server 220 at least a some (hereinafter, initial segments) of the media segments composing each content and store them in the storage 320 (S600). For example, the download agent 300 may download as initial segments the media segments by a preset number counted from a preset playback start point of each of the M contents and store them in the storage 320. In this case, the number of initial segments of each content downloaded by the download agent 300 may satisfy a condition as shown in Equation 1.

$$N_i \geq N_{min}, i \in C \quad \text{Equation 1}$$

Here, C is a list of content included in the playlist, $N_i$ is the number of initial segments to be pre-downloaded for the i-th content in C, and $N_{min}$ is the minimum required number of segments to be buffered in the player at the start of playback to overcome network jitter.

Meanwhile, FIG. 6 illustrates an example wherein the initial segments include media segments by a preset number counted from the first media segment of each content, but the present disclosure is not limited to this configuration. For example, if the plurality of content includes content that has been viewed by the user, the initial segments may include media segments by a preset number counted from the media segment corresponding to the last viewing point of that content.

When the i-th content of the list of content included in the playlist is selected as the content to be played, the player 360 may obtain a request to play the i-th content (S610). For example, but not limited to, the player 360 may receive from the user interface 380 a content playback request including a streaming URL of the i-th content. In another example, the download agent 300, upon receiving the content playback request, may transfer the streaming URL of the i-th content to the player 360.

The player 360 may request the local web server 340 for the initial segments of the i-th content (S620). Here, the player 360 may request the local web server 340 for the initial segments of the i-th content by using, but not limited to, the streaming URL of the i-th content. In other embodiments, the player 360 may request the local web server 340 for the initial segments of the i-th content by using separate identifying information that identifies each piece of content and/or segments of each piece of content within the client device 200.

The local web server 340 may transfer, to the player 360, the initial segments of the i-th content from among the media segments stored in the storage 320 (S630). In Step S630, the transmission of the initial segments occurs internally of the client terminal 200, which does not cause head of line (HOL) blocking issues and allows for arbitrary high-speed transmission. This can fill the buffer within the player 360 quickly.

The local web server 340 may request the download agent 300 to download the remaining segment(s) of the i-th content for complete playback of the i-th content (S640). Accordingly, the download agent 300 may continuously download and store the remaining segment(s) of the i-th content in the storage 320 (S650), and the download agent 300 may send a storage notification to the local web server 340 indicating that the segment(s) requires by the local web server 340 have been saved in the storage 320 (S660).

Meanwhile, the initial segments of the i-th content may be played as soon as they are filled in the buffer in the player 360, while the player 360 may continuously request the local web server 340 for the remaining segment(s) of the i-th content (S670).

When the local web server 340 determines that the segment(s) requested in Step S640 are stored in the storage 320, it may continuously transfer them to the player 360 (S680). The local web server 340 may determine whether the remaining requested segment(s) have been stored in the storage 320 through the storage notification received from the download agent 300.

Figure 7:
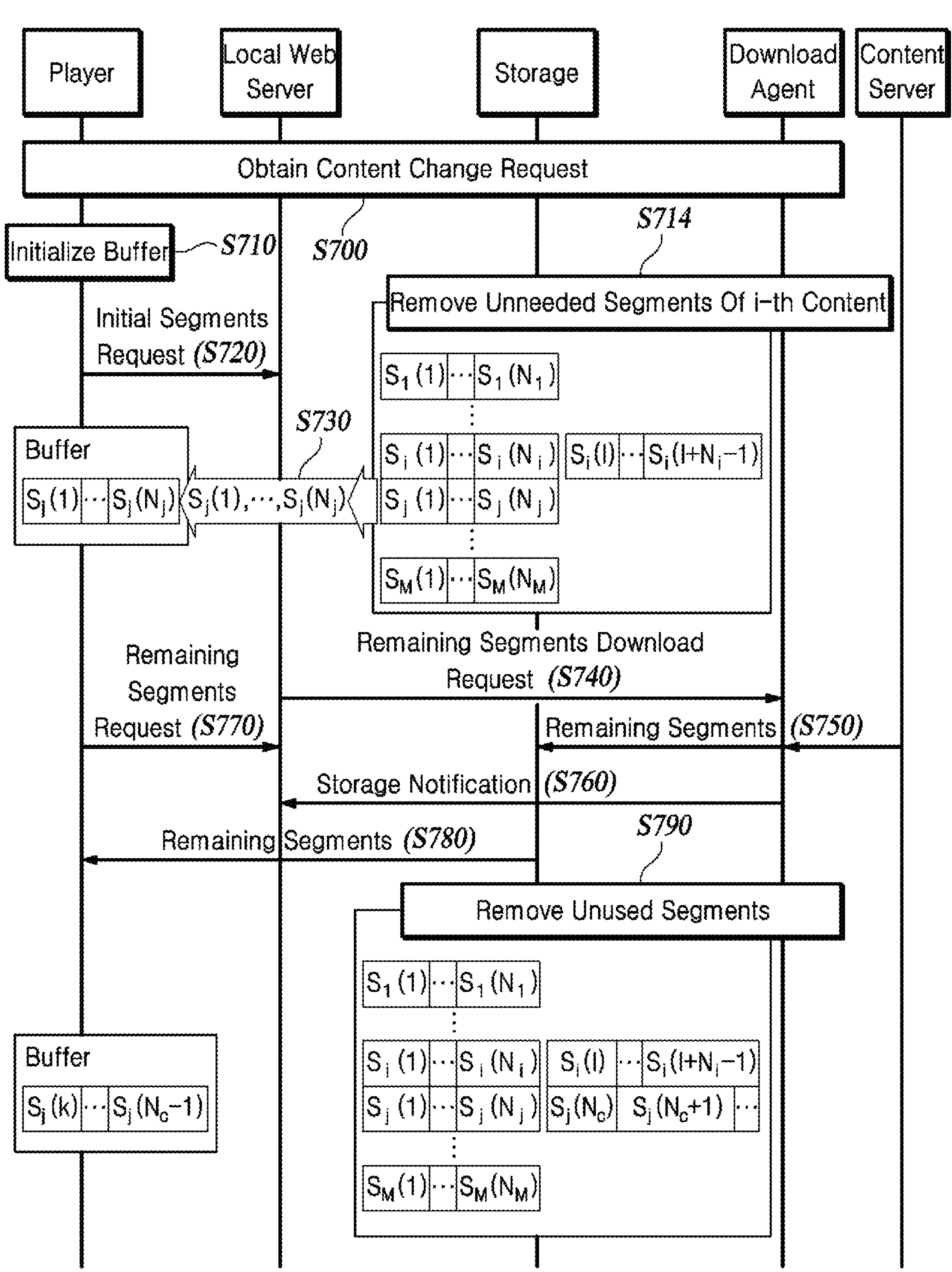
FIG. 7 is a flowchart of operations of a client terminal for seamless playback of changed content, according to at least one embodiment of the present disclosure.

FIG. 7 is a flowchart of operations of the client terminal for seamless playback of changed content, according to at least one embodiment of the present disclosure.

Hereinafter, specific operations of the client terminal 200 in Steps S570 through S590 of FIG. 5 will be described with reference to FIG. 7. FIG. 7 illustrates an example content switching from i-th content to j-th content, wherein a segment corresponding to the last viewing point of i-th content may be represented as $S_i(I)$.

Once the j-th content is determined to be content to change to, the player 360 and the download agent 300 may obtain a content change request to the j-th content (S700). For example, the player 360 and the download agent 300 may receive from the user interface 380 a content change request that includes a streaming URL of the j-th content, although the present disclosure is not so limited. In another example, the download agent 300, upon receiving the content change request, may transfer the streaming URL of the j-th content to the player 360.

The player 360 may remove all media segments of the i-th content in the buffer (S710).

The download agent 300 may remove unneeded media segments from among the media segments of the i-th content stored in the storage 320 (S714). Here, the unneeded media segments may refer to media segments save the initial segments for playing the i-th content from the beginning and the follow-up segments for playing the i-th content from the last viewing point. Furthermore, the follow-up viewing segments may refer to a preset number of segments counted from the segment corresponding to the last viewing point of the i-th content.

In the example of FIG. 7, the initial segments for playing the i-th content from the beginning are $S_i(1)$ to $S_i(N_i)$, and the follow-up viewing segments for continuously playing are $S_i(I)$ to $S_i(I+N_i-1)$. The download agent 300 may remove the remaining segments $S_i(N_i)$ to $S_i(I-1)$ except for the segments described above.

The player 360 may request the local web server 340 for the initial segments of the j-th content (S720). In response, the local web server 340 may transfer the initial segments of the j-th content stored in the storage 320 to the player 360 (S730), to quickly fill the buffer within the player 360.

The local web server 340 may request the download agent 300 to download the remaining segment(s) of the j-th content for complete playback of the j-th content (S740). In response, the download agent 300 may continuously download the remaining segment(s) of the j-th content and store them in the storage 320 (S750), and the download agent 300 may send the local web server 340 a storage notification indicating that its requested segment(s) have been saved in the storage 320 (S760).

The initial segment(s) of the j-th content may be played as soon as they are filled in the buffer in the player 360, and at the same time, the player 360 may continuously request the local web server 340 for the remaining segment(s) of the j-th content (S770).

When the local web server 340 determines that the segment(s) requested in Step S740 are stored in the storage 320, it may continuously transfer them to the player 360 (S780). The local web server 340 may determine whether the requested remaining segment(s) have been stored in the storage 320 through the storage notification received from the download agent 300.

The download agent 300 may remove unused segments of the segments stored in the storage 320 according to a preset policy (S790). In one example, the segments may be removed to meet a set usage based on the state of the player 360. In another example, segments that have been stored in the storage 320 for a certain amount of time may be removed. For example, when $S_j(N_c)$ is the target segment to be transferred to the player 360 at an unused segment management point, the download agent 300 may remove the remaining segments $S_j(N_j+1)$ to $S_j(N_c-1)$, excluding the initial segments $S_j(1)$ to $S_j(N_j)$, from among the segments corresponding to an earlier point in time than the target segment.

As described above, embodiments of the present disclosure can download a portion of each content in the playlist in advance and provide the same quickly at the time of request, thereby eliminating the time required to obtain the streaming URL of the content after a content playback request or change request. Furthermore, unlike conventional methods that require several seconds to reach available bandwidth due to the slow-start increase in the size of the TCP transmission window, embodiments of the present disclosure can utilize a local web server to arbitrarily increase the size of the TCP transmission window or utilize multiplexing transmissions to reduce initial player buffering time.

That is, as described above in FIG. 1, conventional methods incur all of TCP session connection delay $\Delta_1$, buffering delay $\Delta_2$, and playback delay $\Delta_3$ during content playback (or switching), whereas at least one embodiment of the present disclosure incurs no TCP session connection delay $\Delta_1$ and shortens the time of buffering delay $\Delta_2$ by adjusting the size of the TCP transmission window and/or utilizing multiplexing transmissions. For example, when utilizing a TCP transmission configured with a 4× multiplex, the initial playback delay will be $(\Delta_2/4)+\Delta_3$.

The apparatus or method according to the present disclosure may have the respective components arranged to be implemented as hardware or software, or hardware and software combined. Additionally, each component may be functionally implemented by software, and a microprocessor may execute the function by software for each component when implemented.

Various illustrative implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. The computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of computer-readable recording mediums include non-volatile or non-transitory media such as a ROM, CD-ROM, magnetic tape, floppy disk, memory card, hard disk, optical/magnetic disk, storage devices, and the like. The computer-readable recording mediums may further include transitory media such as a data transmission medium. Further, the computer-readable recording medium can be distributed in computer systems connected via a network, wherein the computer-readable codes can be stored and executed in a distributed mode.

Although the steps in the respective flowcharts/timing charts are described in this specification as being sequentially performed, they merely instantiate the technical idea of some embodiments of the present disclosure. Therefore, a person having ordinary skill in the pertinent art to the respective embodiments could perform the steps without departing from the idea and scope of the embodiments by changing the sequences described in the respective flowcharts/timing charts or by performing two or more of the steps in parallel, and hence the steps in the respective flowcharts/timing charts are not limited to the illustrated chronological sequences.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

REFERENCE NUMERALS

20: streaming service providing system
200: client terminal
220: content server
240: head-end platform
260: API gateway

What is claimed is:

1. A method of operating a terminal for seamless playback of content, the method comprising:
- downloading and storing in a storage of the terminal, by a download agent of the terminal, initial segments of each of a plurality of contents, wherein the initial segments of each content comprise at least some of a plurality of media segments composing each content;
- transferring, by a local web server of the terminal, initial segments of a first content among the media segments stored in the storage to a player of the terminal;
- requesting, by the local web server, the download agent to download remaining segments of the first content;
- transmitting, by the download agent, a storage notification to the local web server indicating that the remaining segments of the first content have been stored in the storage; and
- transferring, by the local web server, the remaining segments of the first content to the player responsive to receiving the storage notification.

2. The method of claim 1, further comprising:
- requesting, by the player, the remaining segments of the first content from the local web server.

3. The method of claim 1, further comprising, before the transferring:
- receiving, by the player, a content playback request including a streaming URL of the first content; and
- requesting, by the player, the initial segments of the first content from the local web server.

4. The method of claim 1, further comprising:
- removing, by the download agent, unneeded media segments among the media segments of the first content stored in the storage in response to a content change request into a second content distinct from the first content.

5. The method of claim 4, wherein the unneeded media segments comprise:
- other media segments among the media segments of the first content stored in the storage, excluding media segments for playing the first content from a beginning and media segments for continuously playing the first content from a last viewing point.

6. The method of claim 1, wherein the initial segments of each content have a certain number that is greater than a minimum required number of segments to be buffered in the player at a start of playback to overcome network jitter.

7. The method of claim 1, wherein the initial segments of each content comprise:
- media segments by a preset number that is counted from a first media segment of each of the contents.

8. The method of claim 1, wherein the initial segments of each content comprise:
- media segments by a preset number that is counted from a media segment corresponding to a last viewing point of each of the contents.

9. The method of claim 1, wherein the plurality of content comprises:
- a plurality of different videos, or a plurality of different sections within a single video.

10. A non-transitory computer-readable recording medium storing instructions for causing, when executed by a computer, the computer to perform the method according to claim 1.

11. A terminal, comprising:
- a download agent configured to:
  - download and store in a storage initial segments of each of a plurality of contents, wherein the initial segments of each content comprise at least some of a plurality of media segments composing each content,
  - transmit a storage notification indicating that remaining segments of a content of the plurality of contents have been stored in the storage; and
- a local web server configured to:
  - transfer, to a player, initial segments of the content of the media segments stored in the storage and to request the download agent to download the remaining segments of the content, and
  - transfer the remaining segments of the content to the player responsive to receiving the storage notification.

* * * * *